United States Patent

[11] 3,601,420

| | | |
|---|---|---|
| [72] | Inventor | John D. Binford<br>Richmond, Ind. |
| [21] | Appl. No. | 855,899 |
| [22] | Filed | Sept. 8, 1969 |
| [45] | Patented | Aug. 24, 1971 |
| [73] | Assignee | Dana Corporation<br>Toledo, Ohio |

[54] VALVE STEM SEAL
10 Claims, 5 Drawing Figs.

[52] U.S. Cl. .................................................. 277/212 C,
   123/188
[51] Int. Cl. .................................................. B61f 15/22
[50] Field of Search .......................................... 123/188 P,
   188 GC; 277/212, 212 C, 162

[56] References Cited
UNITED STATES PATENTS

| | | | |
|---|---|---|---|
| 1,230,689 | 6/1917 | Dahlgren .................. | 123/188 P |
| 3,480,286 | 11/1969 | Kosatka .................... | 123/188 P |
| 3,498,621 | 3/1970 | Wilson ...................... | 277/162 X |

*Primary Examiner*—Robert I. Smith
*Attorneys*—Walter E. Pavlick, Harold D. Shall, Richardson B. Farley and John F. Teigland ABSTRACT: A valve stem seal for sealing against the reciprocating stem of a poppet valve is provided. The seal is formed of an elastomeric material. The seal comprises an annular wall that grips the valve guide and integral with the annular wall, a conical wall that terminates in a conical sealing surface. This sealing surface has annular grooves formed therein and forms a progressively increasing interference fit with the valve stem.

PATENTED AUG24 1971 3,601,420

INVENTOR.
JOHN D. BINFORD
BY Richardson B Farley
ATTORNEY

VALVE STEM SEAL

This invention relates to a valve stem seal for sealing between a valve guide of an internal combustion engine and the stem of a poppet valve mounted for axially reciprocating movement in the valve guide.

In recent years, automotive internal combustion engines have evolved from the predominantly L-head type engine to the overhead valve type engine. Accompanying this development has been increased compression ratios, increased peak r.p.m.'s and substantially higher manifold vacuum. Because of these factors, engine manufacturers have found it necessary to substantially increase the oil supply from that supplied to an L-head engine, both by means of oil splash systems and oil mist systems provided under pressure to the overhead valve mechanism. This increased supply is needed in the rocker arm area of overhead valve and cam designed engines to maintain durability of the rocker arms, rocker shafts, push rods, valve stems and valve guide of these engines. As a result of these design modifications, the consumption of oil passing through the valve guide into the combustion chamber has become a problem of critical importance.

Upon the development of overhead valve type engines, umbrella type shields were used to deflect the majority of the oil supplied from the upper end of the valve guides. However, since this type of device did not provide sufficient positive control, it did not perform satisfactorily in an environment where a copious amount of lubricant was present, both in liquid and particle (i.e., mist) form and the lubricant was subjected to the negative pressure of the manifold vacuum and also gravitational force.

In present day engines, a valve stem seal must function to positively control the flow of oil to the valve stem guide, that is to say, it must function to restrain all oil except for a thin film on the valve stem which serves to lubricate between the valve stem and the valve guide and between the valve stem and the valve stem seal itself. Further, in view of warranties given by motor vehicle manufacturers for their engines, these seals must have an extended life (in excess of 50,000 miles) under adverse operating conditions ranging from cold starts to prolonged running at high temperature. Further, and in addition to high reliability, these seals must be able to be manufactured economically in large volumes with a minimum of labor. Also, they must be capable of being installed rapidly with a minimum of labor.

Accordingly, a primary objective of this invention is to provide a valve stem seal with high reliability even under adverse operating conditions.

A further object of this invention is to provide a valve stem having extended life under engine operating conditions.

A still further object of this invention is to provide a valve stem seal that is economically produced and easily installed, all with a minimum of labor.

Other objects and advantages of this invention will become apparent from the following detailed description and drawings. In the drawings.

In both embodiments of the invention, the valve stem seal of the invention is of one-piece construction and is molded from an elastomeric (i.e., synthetic rubber) compound such as Buna-N or a polyacrylic rubber. The requirements for the elastomeric compound are high oil resistance, high abrasion resistance and high heat resistance.

Figure 1:
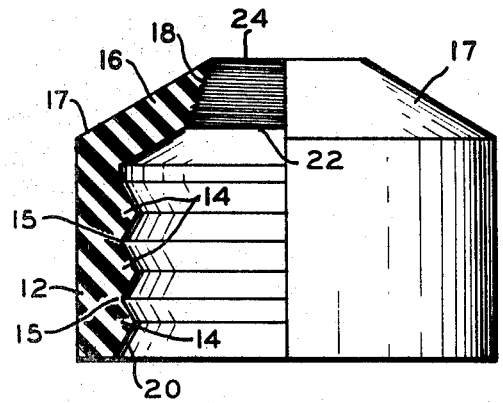
FIG. 1 is a front elevational view, partly in quarter section, of one embodiment of the valve stem seal of this invention.
Figure 3:
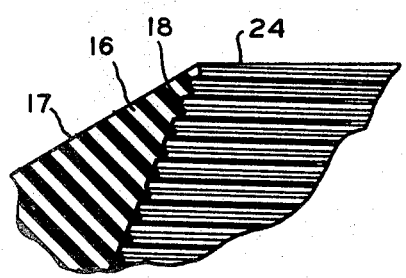
FIG. 3 is an enlarged cross-sectional view of the sealing lip of this invention.

Referring to FIG. 1, the valve stem seal of the invention, generally designated by the numeral 10, comprises an annular wall 12 which has formed on its interior periphery a series of annular ribs or lips 14 that project radially inwardly and serve to secure the valve seal to a valve guide in a manner to be described in greater detail. At the axially upper end of the annular wall 12 is a conical wall section 16 that is integral with the annular wall 12 and which slopes radially inwardly and axially outwardly therefrom. The conical wall 16 terminates in a sealing lip 18 that extends across the width of the termination of conical wall 16 and is formed at an angle thereto so as also to define a truncated conical surface.

The conical wall 16 is essentially of uniform thickness and in this embodiment makes an included angle of 60°±2° (varies slightly with seal size) with the axis of the valve seal 10. In this embodiment, the sealing lip 18 makes an included angle of 20°±2° (varies significantly with seal size) with the axis of the valve seal 10. In manner to be described, essentially all of the sealing lip 18 is disposed against the stem of a poppet valve.

Figure 2:
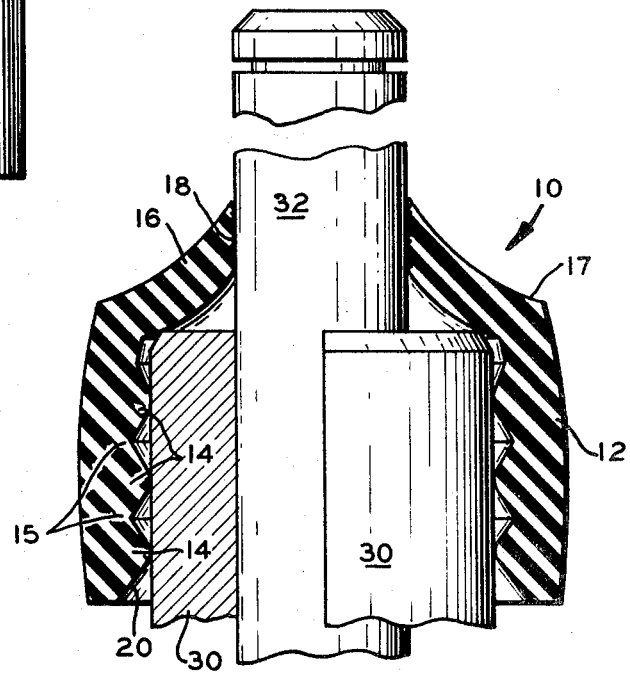
FIG. 2 is a front elevational view, in cross section, showing the valve stem seal of this invention installed on a valve guide and sealing against the stem of a poppet valve.

Referring to FIG. 2, there is shown in cross section; a valve guide 30 of an overhead valve type internal combustion engine (not shown), and mounted for axially reciprocating movement therein, the stem 32 of a poppet valve of said engine. The construction of this type of engine is well known in the art, and accordingly, is not shown. The valve stem guide 32 has limited axial movement commensurate with the valve opening and reciprocates in direct proportion to the r.p.m. of the engine. In a six cylinder engine operating at 3000 r.p.m. each valve stem reciprocates 1500 times per minute.

In prior art devices, it has been found necessary to retain the valve stem seal by means of spring rings or by other external means that clip the seal to the valve guide or which are biased against the valve spring retainer. In the valve stem seal of this invention the interior periphery of the annular wall 12 is provided with a series of annular lips which are concentric and axially spaced apart. The sloping surfaces of the annular ribs make an included angle of 60°±2° with the axis of the seal thus forming at the apex of a rib an included angle of 120° and a similar angle at the root between lips. The root diameter 15 between lips is preferably made slightly less than the outside diameter of the valve guide 30 to have a slight interference fit therewith. Accordingly, a substantial interference fit occurs between the ribs 14 and the valve guide 30. For a valve guide having a diameter of ⅝, the ribs 14 have a maximum internal diameter which produces an approximate 5 percent interference fit with the diameter of the valve guide upon assembly.

At the lower end of the internal wall of the annular wall 12, there is formed a chamfer surface 20 which provides an opening that has a diameter which is greater than the diameter of the valve guide 30. This permits the valve seal 10 to be centered on the valve guide 30 and more easily pressed onto the valve guide.

The sealing lip 18, which as previously described defines a truncated conical surface, has at its axially inner end a major diameter 22 and at its axially outer end a minor diameter 24. The diameter 22 is made slightly less than the diameter of the valve stem 32 so as to provide a slight interference fit therewith. Accordingly, because of the inward sloping of the sealing lip 18, its minor diameter 24 has a substantial interference fit with the valve stem 32. As may be noted in FIG. 1, the radial cross section of the sealing lip, that is, the thickness of the rubber behind the sealing lip in a radial direction, becomes progressively less in moving from the major diameter 22 to the minor diameter 24.

The sealing lip 18 has formed thereon a single pitch lead thread, which in the preferred embodiment is an acme thread having a depth of 0.005 inch. The purpose of this thread, which becomes compressed against the valve stem, is to provide a minute passageway in which oil is retained to provide a film of lubrication on the valve stem. This type of grooving provides the maximum practical lubrication.

An alternate form of grooving for the sealing lip 18 comprises a series of annular, concentric grooves of similar cross section as an acme thread and having a depth of approximately 0.005 inch. This type of grooving functions as a series of scrapers and permits maximum oil control.

In installing the valve stem seal 10 of this invention, the valve stem 32 is pushed through the valve guide 30 and the valve seal is pushed down onto the stem and seated in sealing engagement on the valve guide. In the alternative, the valve seal 10 may first be seated on the valve guide 30 and the valve stem 32 pushed through the assembled parts.

In assembled relationship the sealing lip 18 forms an interference fit with the valve stem guide. Because of the sloping or conical wall 16 and its angle with respect to the axis of the valve stem seal, a progressively increasing amount of rubber is placed against the valve stem seal in moving from the major diameter 22 to the minor diameter 24.

Opposed to this factor is an interference fit which becomes progressively greater in moving from the major diameter 22 to the minor diameter 24. The net effect is that while the greatest amount of compressible rubber is at the major diameter 22 the least amount of interference or compression of the rubber occurs at this point. On the other hand, the least amount of compressive rubber is at the minor diameter 24 while the greatest amount of compression, or tensioning of the rubber, occurs at this point. It has been discovered that these design factors result in the greatest amount of wear, which is a functional load or force (FIG. 4), occurring midway between the major and minor diameters.

As a result of this loading and the resulting wear pattern, the life of the valve seal and its effectiveness is prolonged because the seal at the minor diameter 24 is retained.

Another feature of this invention is the shedlike roof afforded by the sloping surface 17 which serves to lead away oil that has been scraped from the valve stem. Further, because of the wedging function of the conical wall 16 with the valve stem 32, more force is imposed by the interference fit between them on a downward stroke of the valve stem than on an upward stroke. This functional advantage provided by the valve seal 10 tends to keep the same seated on the valve guide 30 and thereby tends to maintain the valve seal 10 in an assembled relationship with the valve guide 30 and valve stem 32.

Figure 5:
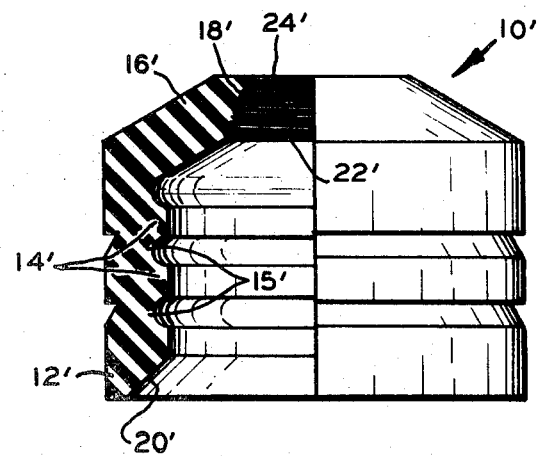
FIG. 5 is a view in cross section of another embodiment of the invention.

In FIG. 5, a second embodiment of the invention is shown. In this embodiment the valve seal 10' includes an annular wall 12' which has formed on its interior periphery a series of annular ribs or lips 14' that project radially inwardly and serve to secure the valve seal 10' to a valve guide such as the valve guide 30. At the axially upper end of the annular wall 12' is a conical wall section 16' that is integral with the annular wall 12' and which slopes radially inwardly therefrom. The conical wall 16' terminates in a sealing lip 18' that extends across the width of the termination of conical wall 16' and is formed at an angle thereto so as to define a truncated conical surface.

Figure 4:
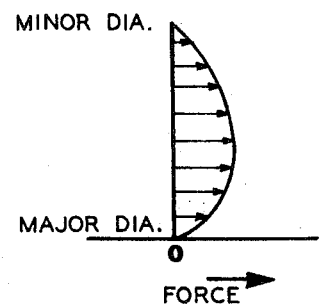
FIG. 4 is a typical force diagram of the seating forces of the instant invention.

The conical wall 16' is essentially of uniform thickness and in this embodiment of the invention makes an included angle of 60°±2° (varies with seal size) with the axis of the valve seal 10'. Also, in this embodiment, the sealing lip 18' makes an included angle of 7°±2° (varies with seal size) with the axis of the valve seal 10 so as to limit the interfering fit somewhat more than in the first embodiment. As in the first embodiment essentially all the sealing lip 18' is disposed against the stem of the poppet valve 32 and the force diagram of FIG. 4 is exemplary of this seal.

The interior periphery of the annular wall 12 is provided with the series of annular ribs or lips 14 which are concentric and axially spaced apart by a series of semicircular grooves or roots 15'. The sides of the annular ribs are curved, based on the fact that the grooves 15' are formed in a semicircle configuration. Exemplary dimensions of the land and annular lips are 0.025 inch radii for the grooves 15' and for the flat apex surface of the ribs 14' approximately 0.046 inch. In a manner similar to the first embodiment, the root diameter 15' between lips is preferably made slightly less than the outside diameter of the valve guide 30 to have a slight interference fit therewith. Accordingly, a substantial interference fit occurs between the ribs 14' and the valve guide 30. For a valve guide having a diameter of five-eighths inch, the ribs 14' have a maximum internal diameter of approximately 0.59 inch or an interference fit of approximately 5 percent based on the diameter. Further because of the relatively large dimension of the flat apex surface of the ribs 14' the holding force between the ribs 14' and valve guide 30 is increased over that disclosed in the first embodiment.

At the lower end of the internal wall of the annular wall 12, there is formed a chamfer 20' which provides an opening that has a diameter which is greater than the diameter of the valve guide. This permits the valve seal 10' to be centered on the valve guide 30 and more easily pressed onto it.

The sealing lip 18', which as previously described defines a truncated conical surface, has at its axially inner end a major diameter 22' and at its axially outer end minor diameter 24'. The diameter 22 is made slightly less than the diameter of the valve stem 30 so as to provide a slight interference fit therewith. Accordingly, because of the inward slope of the sealing lip 18', its minor diameter 24' has a substantial interference fit (but not as substantial as in the first embodiment) with the valve stem 32. As may be noted in FIG. 5, the radial cross section of the sealing lip in a radial direction, becomes progressively less in moving from the major diameter 22' to the minor diameter 24'. Thus, the force curve and FIG. 4 is arrived at and a low wear rate established.

The sealing lip 18' has formed thereon a series of annular, concentric grooves of similar cross section to an acme thread and having a depth of approximately 0.005 inch. This grooving provides a series of scrapers that permits maximum oil control.

While only a pair of embodiments of the invention have been shown and described it will be readily apparent to one skilled in the art that many changes can be made to either of these embodiments without departing from the scope and obvious equivalents of the invention.

What is claimed is:

1. An elastomeric valve stem seal for sealing between a valve stem and a valve guide, comprising an annular skirt portion adapted to form an interference fit with said valve guide, said skirt portion having a series of longitudinally spaced annular ribs formed on its interior wall, a conical wall integral with one axial end of said skirt and sloping radially inwardly and axially outwardly of said skirt portion, said conical wall being of uniform thickness and terminating at its inner end in a conical sealing surface adapted to form a progressively increasing interference fit with said valve stem, and a series of circumferentially extending grooves formed in said sealing surface.

2. The valve stem seal of claim 1, wherein the included angle between said conical wall and the axis of said valve stem is greater than the included angle between said sealing surface and the axis of said valve stem, and the combined total said included angles is less than 90°, whereby substantially all of said sealing surface sealingly engages said valve stem and applies a progressively increasing and decreasing force in an axial direction against said valve stem.

3. The valve stem seal of claim 2, wherein the annular ribs are concentric and spacedly displaced by grooves.

4. The valve stem seal of claim 3, wherein the ribs are formed by "V" grooves.

5. The valve stem seal of claim 3, wherein the grooves are semicircular in cross section.

6. An elastomeric valve stem seal for sealing between the stem of a poppet valve and a valve guide, comprising an annular skirt portion adapted to sealingly engage said valve guide and a frustoconical wall portion integral with one axial end of said skirt and terminating in an annular frustoconical sealing surface having a major diameter and a minor diameter, said sealing surface having a smaller included angle with the axis of said stem than said wall portion, the major diameter of said sealing surface forming an interference fit with said stem, whereby said sealing surface provides an increasing interference fit with said valve stem in moving axially from the major diameter to the minor diameter.

7. The valve stem seal of claim 6, wherein the included angle between said frustoconical wall portion and the axis of the valve stem is more than 45° and the included angle between said sealing surface and the axis of said valve stem is less than 30°, whereby the radial force exerted by said sealing surface on the valve stem progressively increases and decreases in an axial direction.

8. The valve stem seal of claim 6, wherein the frustoconical wall portion is of substantially uniform thickness.

9. The valve stem seal of claim 6, wherein the interior periphery of the annular skirt portion is provided with a series of concentric and axially spaced annular ribs adapted to frictionally engage said valve stem guide.

10. The valve stem seal of claim 6, wherein said sealing surface is provided with a series of annular and axially spaced ribs.